(12) United States Patent  
Yokoyama

(10) Patent No.: US 6,478,329 B1
(45) Date of Patent: Nov. 12, 2002

(54) AIR BAG

(75) Inventor: Aki Yokoyama, Fuji (JP)

(73) Assignee: Nihon Plast Co., Ltd. (JP)

( * ) Notice: Subject to any disclaimer, the term of this patent is extended or adjusted under 35 U.S.C. 154(b) by 0 days.

(21) Appl. No.: 09/533,351

(22) Filed: Mar. 23, 2000

(30) Foreign Application Priority Data

Apr. 13, 1999 (JP) .......................................... 11-105387

(51) Int. Cl.$^7$ .............................................. B60R 21/24
(52) U.S. Cl. ................................... 280/729; 280/730.2
(58) Field of Search .......................... 280/743.1, 743.2, 280/730.2, 729, 730.1

(56) References Cited

U.S. PATENT DOCUMENTS

| 5,100,168 | A | * | 3/1992 | Horiuchi et al. ......... 280/728.1 |
| 5,249,824 | A | * | 10/1993 | Swann et al. ................ 280/729 |
| 5,310,216 | A | * | 5/1994 | Wehner et al. ........... 280/743.1 |
| 5,447,330 | A | * | 9/1995 | Tagawa et al. ............. 280/739 |
| 5,584,508 | A | * | 12/1996 | Maruyama et al. ....... 280/743.1 |
| 5,647,609 | A | * | 7/1997 | Spencer et al. .......... 280/730.2 |
| 5,692,774 | A | * | 12/1997 | Acker et al. ................ 280/729 |
| 5,722,685 | A | * | 3/1998 | Eyrainer ................... 280/730.2 |
| 5,779,261 | A | * | 7/1998 | Honda ...................... 280/728.2 |
| 5,791,685 | A | * | 8/1998 | Lachat et al. ............ 280/743.1 |
| 5,845,935 | A | * | 12/1998 | Enders et al. ............ 280/743.2 |
| 5,848,804 | A | * | 12/1998 | White, Jr. et al. ........ 280/743.1 |
| 5,853,191 | A | * | 12/1998 | Lachat .................... 280/730.2 |
| 5,918,902 | A |   | 7/1999 | Acker |
| 5,944,342 | A | * | 8/1999 | White, Jr. et al. .......... 280/729 |
| 5,945,184 | A | * | 8/1999 | Nagata et al. ............. 428/35.2 |
| 6,059,311 | A | * | 5/2000 | Wipasuramonton et al. ..... 280/729 |
| 6,062,594 | A | * | 5/2000 | Asano et al. ............ 280/730.2 |
| 6,106,004 | A | * | 8/2000 | Heinz et al. ................ 280/729 |
| 6,129,382 | A | * | 10/2000 | Tonooka .................. 280/743.1 |
| 6,270,113 | B1 | * | 8/2001 | Wipasuramonton et al. ..... 280/730.2 |
| 6,279,944 | B1 | * | 8/2001 | Wipasuramonton et al. ..... 280/730.2 |

FOREIGN PATENT DOCUMENTS

| DE | 44 42 591 A | | 6/1995 |
| DE | 296 06 709 U | | 9/1996 |
| EP | 0 810 125 A | | 12/1997 |
| JP | 09058387 | * | 3/1997 |
| JP | 9-164899 | | 6/1997 |
| JP | 2000062563 | * | 2/2000 |

* cited by examiner

Primary Examiner—Brian L. Johnson
Assistant Examiner—Christopher Bottorff
(74) Attorney, Agent, or Firm—Kilpatrick Stockton LLP

(57) ABSTRACT

A bag includes a first base cloth having a first edge portion, a second base cloth having a second edge portion, and an inner space defined by the first and second base cloths. A sewing thread is for joining the first edge portion and the second edge portion. A third base cloth is joined with the first edge portion and the second edge portion by the sewing thread. The third base cloth has an inner edge portion extending to the inner space for covering the sewing thread.

12 Claims, 8 Drawing Sheets

AIR BAG

FIELD OF THE INVENTION

The present invention relates to an air bag which expands to develop in accordance with inflow of gas, and particularly to an air bag and an air bag apparatus which is applied to an automobile.

BACKGROUND OF THE INVENTION

Conventionally, for example, in order to protect an occupant of an automobile from an impact, there has been employed an air bag apparatus which introduces gas discharged from an inflator into an air bag so as to expand to unfold the air bag. Further, for example, an outer peripheral portion of two base cloths is sewed by means of a sewing thread, thus forming the air bag in a bag shape. Further, a so-called pyro-type inflator structured such that a gas-producing agent is quickly reacted and gas is injected into the air bag is employed for the inflator, whereby a high temperature and high-pressure gas is injected.

SUMMARY OF THE INVENTION

As mentioned above, in an air bag manufactured by sewing, when the inflator is operated, a tensile force by which the air bag expands to unfold is applied to the sewed portion in the outer periphery of the air bag, and the sewing thread is exposed to the high-temperature gas. In particular, with respect to an air bag for a driver's seat and an air bag for a front passenger's seat in which a tether for restricting the unfolding shape of the air bag and a partition wall for separating an interior portion of the air bag into a plurality of chambers are provided, or a side air bag developing from a side portion of the seat, or a curtain-type air bag for protecting a head portion and the like, it is hard to perform a turning inside-out operation after the air bag is sewed, so that a structure which is not turned inside out after the base cloths are sewed is employed. Then, in this structure, the sewing thread of the air bag is largely exposed at a time when the air bag is expanded to unfold and is directly exposed to the high temperature gas which is discharged from the inflator. Further, for example, since the gas generated from the inflator is injected toward a specially defined direction in the side air bag shown in Japanese Patent Application Laid-Open (JP-A) No. 9-164899, the sewing thread of the sewed portion in the specially defined area is readily affected by the heat.

Accordingly, it is necessary to work out a countermeasure against the heat, for example, or else it will be necessary to reduce the capacity of the inflator. Otherwise, it is necessary to use a sewing thread having a high heat resistance or to sew the sewing thread at twice or three times, when forming the sewed portion, which increases the manufacturing cost of the air bag.

An object of the present invention thus is to provide an air bag in which heat resistance of a sewed portion can be improved by a simple structure.

To achieve the object, a first aspect of the invention is provided with an air bag including features as follows. A bag includes a first base cloth having a first edge portion, a second base cloth having a second edge portion, and an inner space defined by the first and second base cloths. A sewing thread is used for joining the first edge portion and the second edge portion. A third base cloth is joined with the first edge portion and the second edge portion by the sewing thread. The third, base cloth has an inner edge portion extending to the inner space for covering the sewing thread.

Preferably, the third base cloth is integrally formed with a fourth base cloth which separates the inner space into a plurality of chambers.

Preferably, the first edge portion and the second edge portion are positioned outside the bag.

Preferably, the third base cloth is positioned in opposition to an inflator, so that the third base cloth is directly exposed to the gas from the inflator.

Preferably, the air bag is a side air bag which is positioned at a side portion of an automobile seat to expand to unfold.

Preferably, the bag comprises a fourth base cloth which separates the inner space into a thorax protection portion and a head protection portion, and the fourth base cloth is integrally formed with the third base cloth.

A second aspect of the invention is provided with an air bag, apparatus including features as follows. An inflator provides discharging gas and a bag accommodates the inflator filled with the discharged gas. A sewing thread joins a portion adjacent to a peripheral edge of the bag. A protection cloth is interposed between the inflator and the sewing thread for protecting the sewing thread from the discharged gas.

Preferably, the protection cloth is sewed by the sewing thread with the bag, and the protection cloth flaps inside the bag.

Preferably, the air bag apparatus further includes an intermediate cloth which separates an inner space of the bag into a plurality of chambers. The protection cloth is integrally formed with the intermediate cloth.

Preferably, the bag has an edge portion sewed by the sewing thread, and the edge portion is positioned outside the bag.

Preferably, the protection cloth is positioned in opposition to the inflator, so that the protection cloth is directly exposed to the gas from the inflator.

Preferably, the air bag apparatus is a side air bag apparatus which is positioned at a side portion of an automobile seat and to expand and unfold.

Preferably, the bag includes an intermediate cloth which separates an inner space of the bag into a thorax protection portion and a head protection portion, and the intermediate cloth is integrally formed with the protection cloth.

In accordance with the invention mentioned above, a third base cloth or a protection cloth prevents a sewing thread from being exposed to an inner space of the air bag, whereby heat resistance of the sewing portion is improved. Because the third base cloth or the protection cloth is joined by the sewing thread, a simple structure can be obtained and manufacturing cost can be reduced.

Because the fourth base cloth or the intermediate cloth is integrally formed, the number of parts can be reduced, a simple structure can be obtained and manufacturing cost can be reduced.

With respect to an air bag which is not turned inside out after the sewed portion is formed, the sewing thread is prevented from being exposed to the inner space of the air bag, whereby heat resistance of the sewing portion is improved.

Due to the preferable arrangement of the third base cloth or the protection cloth, the heat resistance of the needed portion can be improved.

Thus, the heat resistance of a side air bag can be improved and manufacturing cost can be reduced.

BRIEF DESCRIPTION OF THE ACCOMPANYING DRAWINGS

DETAILED DESCRIPTION OF THE PREFERRED EMBODIMENTS

A description will be given below of an embodiment of an air bag in accordance with the present invention with reference to the accompanying drawings.

Figure 1:
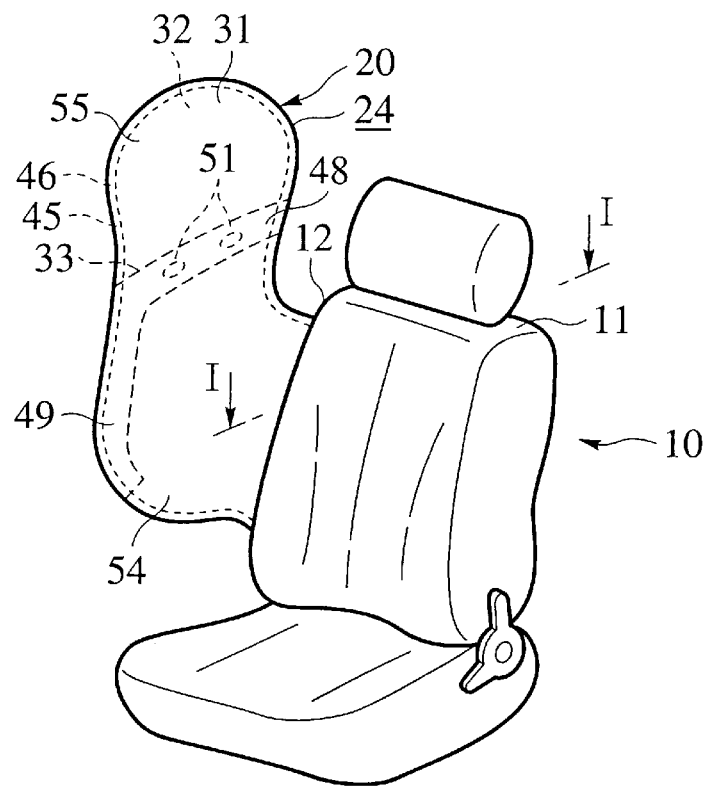
FIG. 1 is a perspective view showing a seat in which an air bag apparatus in accordance with the present invention is assembled and a developing state of an air bag.
Figure 2:
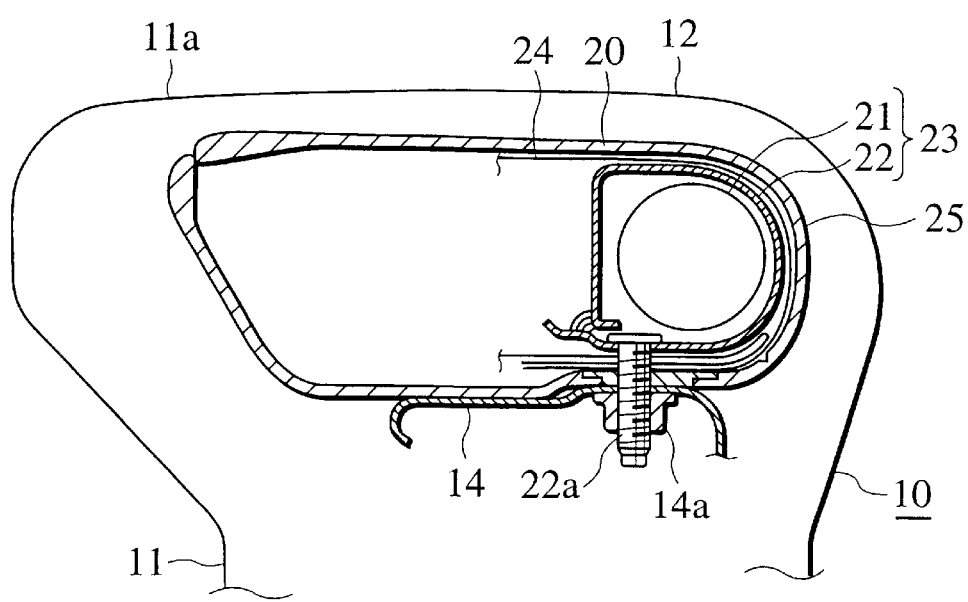
FIG. 2 is a cross-sectional view of the air bag apparatus taken along line 1—1 in FIG. 1.

In FIGS. 1 and 2, a seat 10 of an automobile corresponds to a member to which an air bag apparatus 20 is mounted. The seat 10 has a seat back 11 including an outer skin 11a, and a seat frame 14 provided within a side portion 12 of the seat back 11, and the air bag apparatus 20 is fixed to the seat frame 14. The air bag apparatus 20 constitutes a so-called side air bag apparatus (an air bag apparatus for a lateral collision) which is expanded to unfold among a center pillar, a door panel and an occupant on the seat 10.

The air bag apparatus 20 is provided with gas discharging means 23 having an inflator 21 for generating and discharging gas and a retainer 22 for covering the inflator 21, a bag-shaped air bag 24 expanding to unfold due to gas discharged from the inflator 21, and a resin case body (cover) 25 for receiving these members.

The inflator 21 constitutes a so-called pyro-type inflator. The inflator 21 has a main body portion which is formed in a substantially cylindrical shape and reacts propellant charged within the main body portion, so that a high-temperature and high-pressure gas is discharged from a gas discharge port provided in a curved surface of one end portion. Further, the retainer 22 is formed in a cylindrical shape by using a metal plate or a resin material, and has an inner size greater than an outer diameter of the main body portion of the inflator 21. An injection port for the gas is formed on a front surface portion of the retainer 22, and a pair of stud bolts 22a is fixed to a side portion by welding. The gas discharge port of the inflator 21 and the gas discharge port of the retainer 22 are not directly opposed in a state that the inflator 21 is fixed to the inner side of the retainer 22. The gas discharged from the injection port of the inflator 21 is cooled and discharged from the gas discharge port of the retainer 22.

Figure 3:
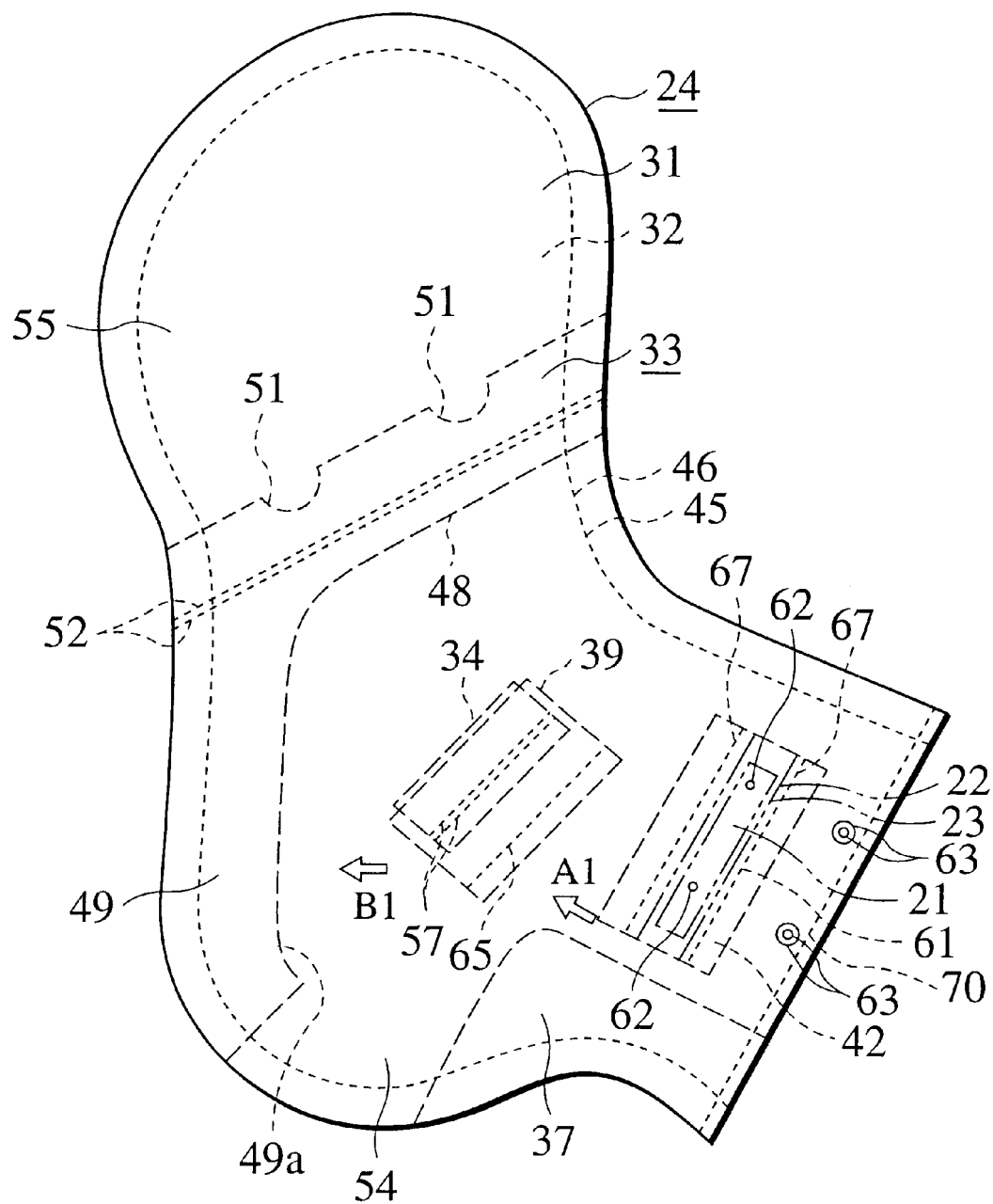
FIG. 3 is a side elevational view showing the air bag in accordance with the present invention in an enlarged manner.
Figure 4:
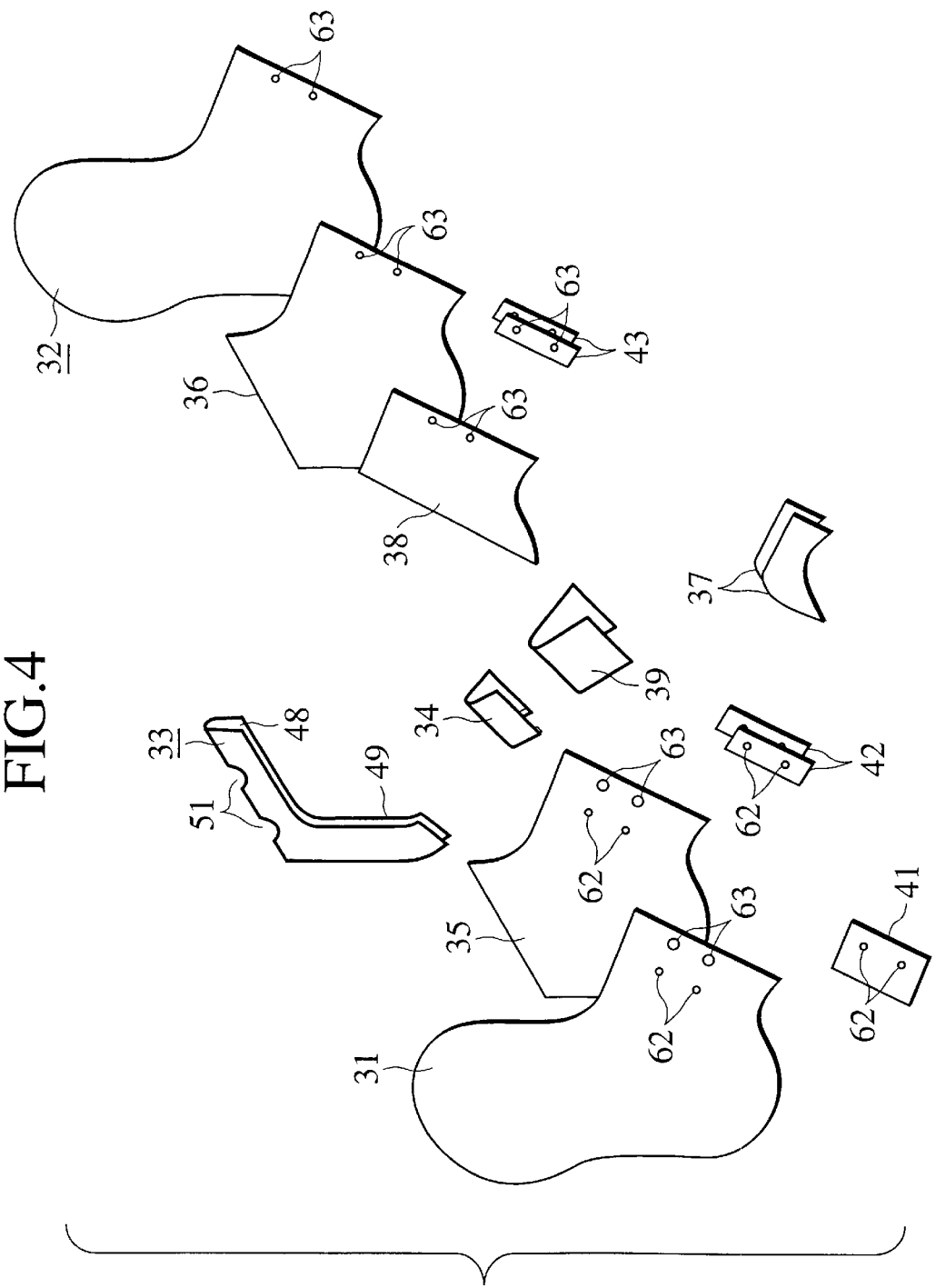
FIG. 4 is a perspective view showing the air bag in FIG. 3 in an exploded manner.
Figure 5:
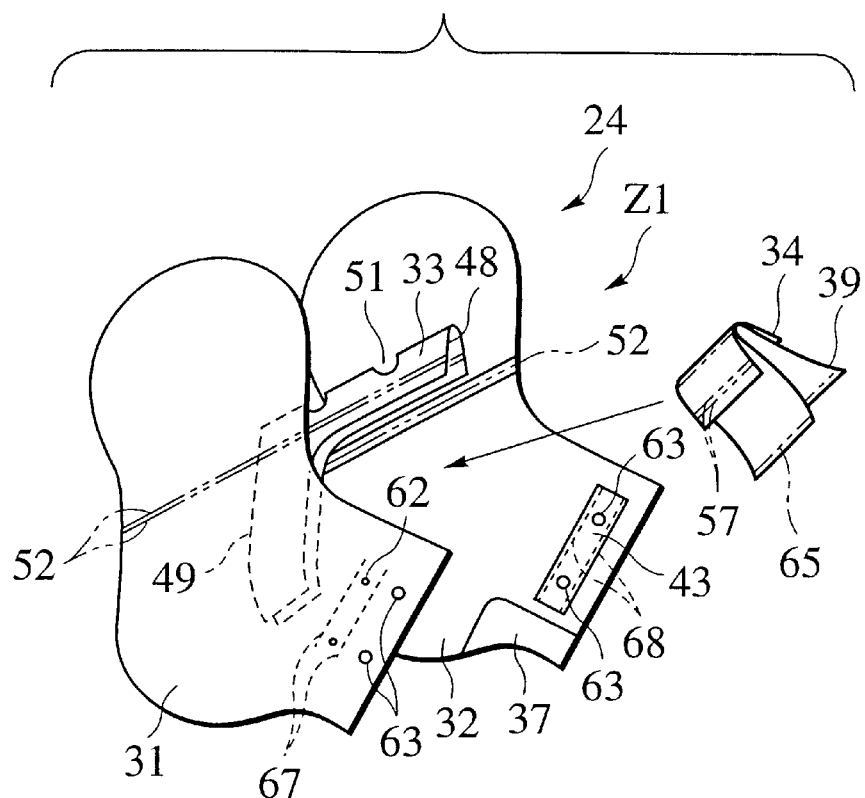
FIG. 5 is a schematic view showing a process of manufacturing the air bag.
Figure 6:
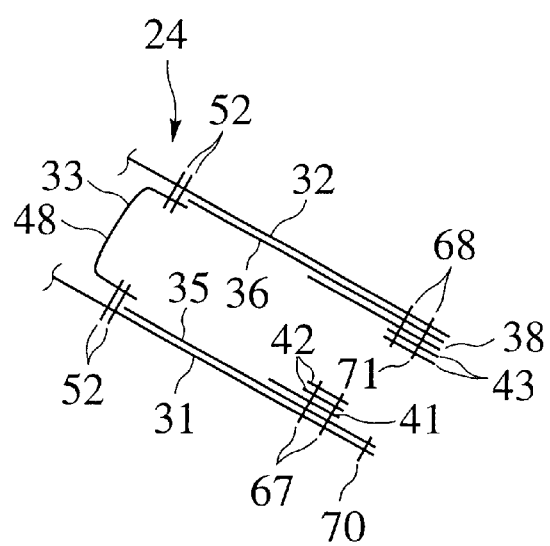
FIG. 6 is a view as seen from an arrow Z1 in FIG. 5 showing the process of manufacturing the air bag.

The air bag 24 as a bag is, as shown in FIG. 3, provided with a first base cloth (a base cloth on a side of an occupant) 31, a second base cloth sewed to the first base cloth (a base cloth on a side opposite to the occupant) 32, an intermediate base cloth 33 corresponding to a fourth base cloth serving as a partition wall (a baffle) for separating into partitioned chambers 54 and 55, and a suspending sheet piece (a tether) 34. The air bag 24 is, as shown in FIGS. 4 through 6, provided with a flame proofing cloth which is constituted by a first flame proofing cloth (a large flame proofing cloth on a side of the occupant) 35, a second flame proofing cloth (a large flame proofing cloth on a side opposite to the occupant) 36, a third flame proofing cloth corresponding to a third base cloth (a flame proofing cloth in the thorax) 37, a fourth flame proofing cloth (a flame proofing cloth on a side opposite to the occupant) 38, and a fifth flame proofing cloth (a tether flame proofing cloth) 39. The air bag 24 is, as shown in FIGS. 3 through 6, provided with a first reinforcing belt (a large reinforcing belt on a side of the occupant) 41 constituting a reinforcing cloth, a second reinforcing belt (a small reinforcing belt on a side of the occupant) 42, and a third, reinforcing belt (a small reinforcing belt on a side of the occupant) 43. The third flame proofing cloth 37 and the fourth flame proofing cloth 38 correspond to a woven fabric the entire surface of which is coated with a silicone so as to increase a heat resistance. The other members are constituted by a non-coated woven fabric to which no coating is applied.

The first base cloth 31 and the second base cloth 32 are formed in the same substantially L shape with each other. A sewed portion 46 corresponding to a connection portion which is sewed by a sewing thread 45 is formed along a portion near an end edge portion of an outer periphery of the base cloths 31 and 32 except the base end portion, thereby constituting a flat bag-like outer contour.

Figure 7:
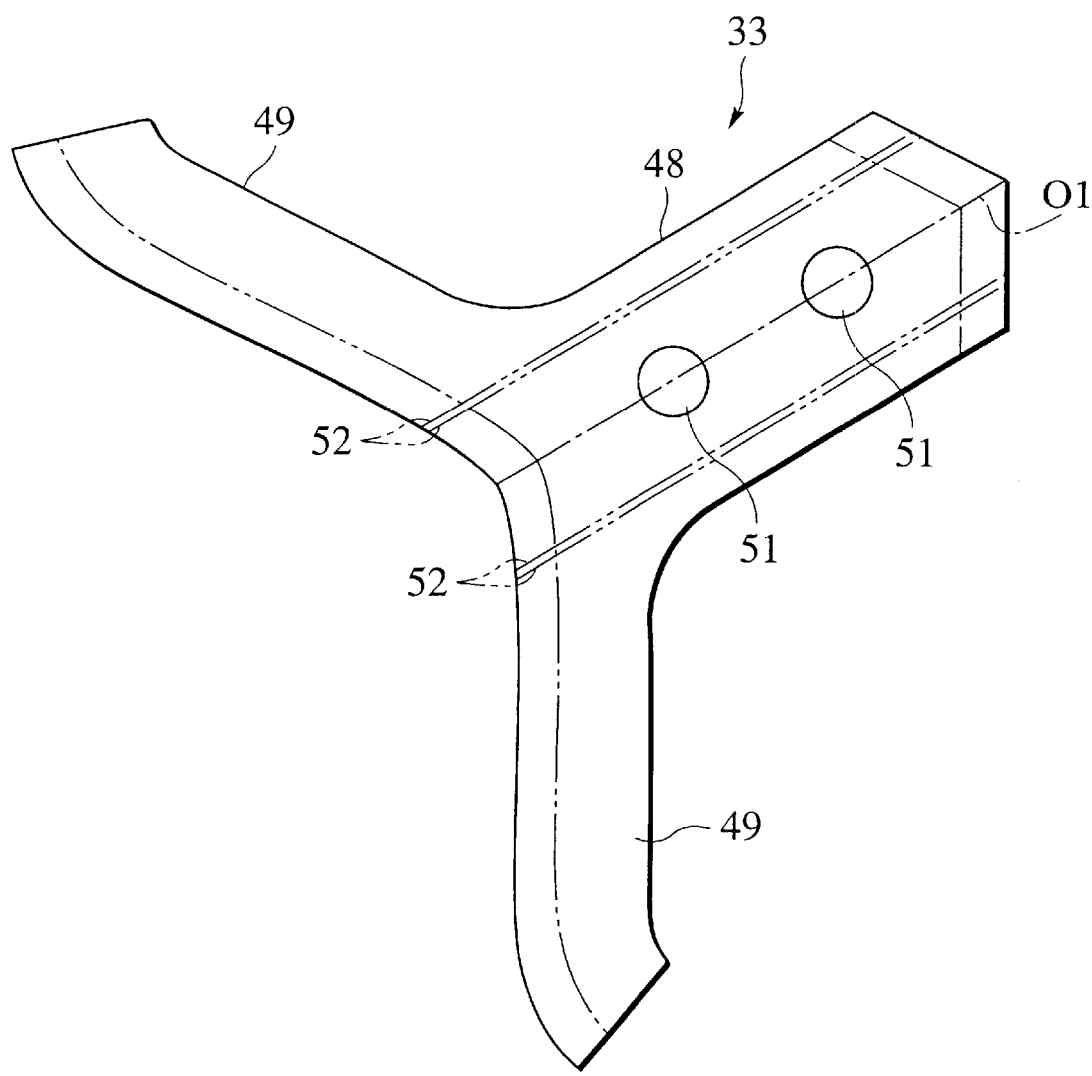
FIG. 7 is a perspective view showing an intermediate base cloth of the air bag in an enlarged manner.

The intermediate base cloth 33 is, as shown in FIG. 7 and the like, formed symmetrically with respect to a center line O1. The base cloth 33 is provided with a partition wall portion 48 and a pair of flame proofing portions 49 formed so as to integrally extend to the partition wall portion 48 and serving as a third base cloth. For example, a single or a plurality of circular communication portions 51 are formed in this partition wall portion 48. Shoulder side portions disposed in a longitudinal direction of the partition wall portion 48 are respectively sewed with the first base cloth 31 and the second base cloth 32 along a sewing line 52. As a result, an inner side of the air bag 24 is separated into two occupant protection portions which have the thorax protection portion 54 corresponding to a partitioned chamber positioned in a lower side, that is, in a side of the base end and the head protection portion 55 corresponding to the partitioned chamber positioned in an upper side, that is, in a side of the front end.

The flame proofing cloth 49, or a third cloth and protection cloth, of the intermediate base cloth 33 is arranged along a part of a front side of the sewing portion 46 of the thorax protection portion 54. The base cloth 33 is integrally sewed between the first base cloth 31 and the second base cloth 32 by the sewing thread 45. That is, the flame proofing cloth 49 does not cover all the surface of the thorax protection portion 54, but is arranged in a position which is directly exposed to the gas generated from the inflator 21, that is, in a side which is directed to gas injection port of the retainer 22. The cloth 49 is interposed between the sewing thread 45 and the inflator 21. First and second edges 49a in an inner side of the flame proofing cloth 49 are formed so as to slightly protrude to an inner side by the sewing thread 45.

In addition, in the thorax protection portion 54, there is arranged a suspending sheet piece 34 which is sewed to first base cloth 31 and the second base cloth 32 by predetermined sewing lines 57. This suspending sheet piece 34 joins the first base cloth 31 and the second base cloth 32 together to restrict a configuration for fixing at the time of unfolding.

The thorax protection portion 54 is provided with an inflator arranging portion 61 which is positioned on a base side of the suspending sheet piece 34 and into which the retainer 22 accommodating the inflator 21 is arranged. Then, the first base cloth 31 is formed with first mounting holes 62 through which stud bolts 22a of the retainer 22 pass. In addition, the first base cloth 31 and the second base cloth 32 are formed with second mounting holes 63 through which the stud bolts 22a, having passed through the first mounting holes 62, furthermore pass.

Further, in the thorax protection portion 54, as shown in FIG. 4, the first flame proofing cloth 35 is arranged along the first base cloth 31. The second flame proofing cloth 36 is arranged along the inner surface of the second base cloth 32. At the position exposed to the high temperature gas of the inflator 21, the third flame proofing cloth 37 is arranged along the inner surface of the first flame proofing cloth 35, and the fourth flame proofing cloth 38 is arranged along the inner surface of the second flame proofing cloth 36. These flame proofing clothes are sewed and fixed to the sewed portion 46. Further, in a side of the base end of the suspending sheet piece 34, there is arranged the fifth flame proofing cloth 39 which is sewed with the suspending sheet piece 34 itself and sewed with the first base cloth 31 and the second base cloth 32 by a predetermined sewing line 65, whereby the suspending sheet piece 34 is protected from the heat of the gas.

Further, as shown in FIGS. 4 and 6, the first reinforcing belt 41 and the second reinforcing belt 42 are arranged in the first base cloth 31 so as to be overlapped with the position of a first mounting hole 62, and are sewed by a predetermined sewing line 67. Further, the third reinforcing belt 43 is arranged in the second base cloth 32 so as to be overlapped with a second mounting hole 63, and is sewed by a predetermined sewing line 68. Each of the reinforcing belts 41,42,43 is formed, for example, by overlapping the base cloths and there formed with the mounting holes 62 and 63 communicating with the respective mounting holes 62 and 63. Then, the stud bolt 22a of the retainer 22 shown in FIG. 2 is screwed with a seat frame mounting nut 14a so as to be fixed thereto, whereby the whole air bag apparatus (an air bag module) 20 is supported to the seat frame 14.

Next, a description will be given of a method of manufacturing the air bag 24. At first, as shown in FIG. 4, the first base cloth 31 in the side of the occupant is formed with mounting holes 62 and 63 and is cut in a predetermined shape. A first flame proofing cloth 35 is overlapped on a side of cut first base cloth 31 which corresponds to an inner side when completing sewing, the cloth 35 being formed with mounting holes 62 and 63 and being cut in the same shape as that of thorax protection portion 54.

Overlapped cloths 31 and 35 are sewed along a sewing line 70 of the base end portion corresponding to an inserting side of the retainer 22. Next, the first reinforcing belt 41 and the second reinforcing belt 42 are overlapped with the first flame proofing cloth 35 to position mounting holes 62 and 63, thus to be sewed on the cloth 35.

Further, the second base cloth 32 in the side opposite to the occupant is formed with mounting holes 63 and is cut in a predetermined shape. A second flame proofing cloth 36 and a fourth flame proofing cloth 38 are overlapped on a side of cut second base cloth 32 which corresponds to an inner side when completing sewing, the second cloth 36 being formed with second mounting holes 63 and being cut in the same shape as that of thorax protection portion 54, and the fourth cloth 38 being formed with second mounting holes 63. Overlapped cloths 32, 36, and 38 are sewed along a sewing line 70 of the base end portion corresponding to an inserting side of the retainer 22. Next, the third reinforcing belt 43 are overlapped with the second flame proofing cloth 36 to position the second mounting holes 63, thus to be sewed with the cloth 36.

Next, as shown in FIG. 5, the inner sides of the first base cloth 31 and the second base cloth 32 are overlapped with each other, and the intermediate base cloth 33 is arranged between the base cloths 31 and 32 and is sewed by the predetermined sewing lines 52 and 52.

Further, a component obtained by previously sewing the suspending sheet piece 34 with the fifth flame proofing cloth 39 is prepared. The component is arranged in the vicinity of a center between the first flame proofing cloth 35 and the second flame proofing cloth 36. Each of end portions of the suspending sheet piece 34 is sewed with the first base cloth 31 and the second base cloth 32 respectively along the predetermined sewing line 57. In addition, each end portion of the fifth flame proofing cloth 39 is sewed with the first base cloth 31 and the second base cloth 32, respectively, along the predetermined sewing line 65.

Finally, the outer peripheral portion between the first base cloth 31 and the second base cloth 32, that is, the sewed portion 46, is sewed. At this time, the flame proofing portions 49 are positioned at the innermost position of the air bag 24 and are sewed, the flame proofing portion 49 being extended from the partition wall portion 48 of the intermediate base cloth 33.

Next, the unfolding motion of the air bag 24 is described, referring to FIGS. 2 and 3. At first, when an impact such as a lateral collision or the like is applied to a vehicle, the inflator 21 is actuated by a control apparatus, and a high-temperature and high-pressure gas is discharged from the gas injection port. The gas flows along the portion between the inflator 21 and the retainer 22 and is discharged from the gas injection port of the retainer 22. Further, the discharged gas flows in a direction of an arrow A1 shown in FIG. 3 and subsequently in a direction of an arrow B1, and the air bag 24 which has been folded and accommodated therein starts expanding. Then, the case body 25 is deformed and thus opened due to the pressure of the expansion. Accordingly, due to the pressure of the gas, at first the thorax protection portion 54 separated by the partition wall portion 48 expands to unfold between the door panel and the occupant. Subsequently, the gas flows in the head protection portion 55 through the insertion portion 51 for controlling the flow amount, and the head protection portion 55 is expanded to unfold between the door panel and the occupant. That is, the thorax protection portion 54 and the head protection portion 55 unfold in a sequential manner so as to protect the occupant. At the time of this expansion and development, the suspending sheet piece 34 restricts the unfolded size of the air bag 24 in a transverse direction of the vehicle.

Then, in accordance with the present embodiment, in the air bag 24 provided with at least two base cloths 31 and 32, with respect to the sewed portion 46 in the outer periphery of the air bag 24, since the flame proofing portion 49 corresponding to the base cloth and the flame proofing cloth is held between the base cloths 31 and 32, it is possible to protect the sewing thread 45 of the sewing portion 46 and improve heat resistance of that sewing thread.

Figure 8A:
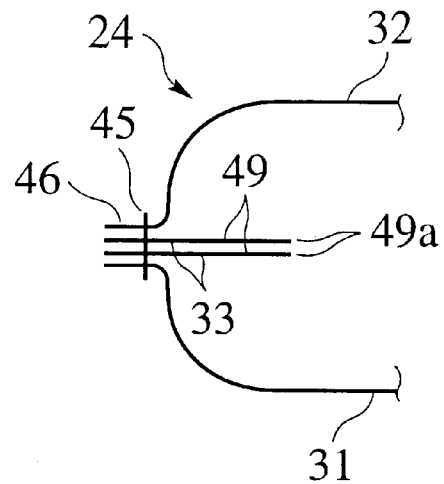
FIG. 8A is a schematic view showing an initial state in a developing or unfolding motion of the air bag.
Figure 8B:
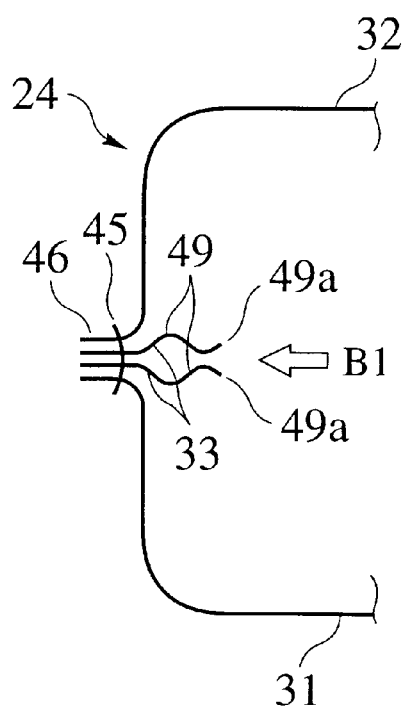
FIG. 8B is a schematic view showing the unfolded state in the unfolding motion of the air bag.
Figure 10A:
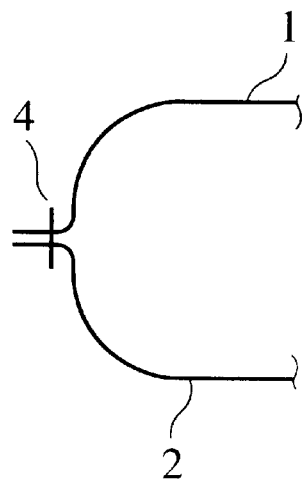
FIG. 10A is a schematic view showing an initial state in a developing or unfolding motion in an air bag in accordance with a conventional structure.
Figure 10B:
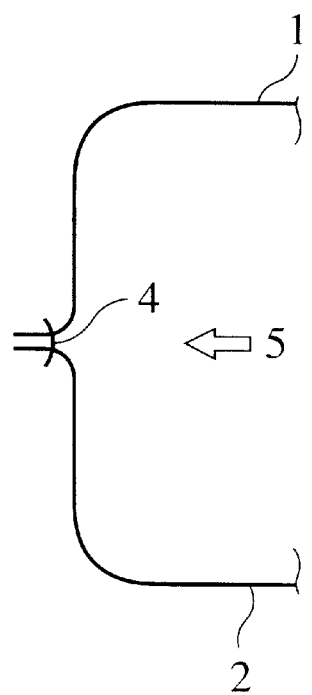
FIG. 10B is a schematic view showing an unfolded state in the unfolding motion of the air bag shown in FIG. 10A.

That is, pressure is applied to the sewing thread 45 of the sewed portion 46 when the air bag 24 is expanded to unfold. In particular, in the case of a side air bag with the structure shown in FIGS. 10A and 10B, a thermal influence arisen at the sewing thread 45 of the sewing portion 46 is increased, the side air bag being structured to discharge the generated gas from the inflator 21 toward a specially defined direction, the side air bag being not turned inside out after sewing the base clothes 31 and 32, and the side air bag using a gas-producing agent-reaction type (a pyro-type) inflator 21 to generate high heat. However, in the present embodiment, since the flame proofing portion 49 is held between the base cloths 31 and 32 to be sewed, it is difficult for the sewing thread 45 to be exposed to the high temperature gas generated from the inflator 21 as shown in FIGS. 8A and 8B. Accordingly, it is possible to protect the sewing thread 45 in the sewed portion 46. That is, the flame proofing portion 49 does not cover all the surface of the inner surface of the air bag 24 but is arranged only at the position along the sewed portion 46. Because the first and second edges 49a are free ends, pressure due to an expansion of the air bag 24 is not applied to the flame proofing portion 49 and the protection can be applied so as to cover the sewing thread 45. Further, no force for peeling out the sewing thread 45 in the sewed portion 46 is applied to the flame proofing portion 49 even when the flame protection portion 49 is shifted to one side due to the pressure of the gas. Therefore, the likelihood that the sewing thread is directly exposed with respect to a length corresponding to first sewing of the sewing thread 45, is reduced so that it is possible to protect the sewing thread 45 by preventing the sewing thread from being exposed.

Further, in accordance with the structure of the present embodiment, the flame proofing portion 49 corresponding to the base cloth is arranged between the base cloths 31 and 32 and is only sewed at the same time. As a result, no special construction and no special means are required, and it is possible to simplify the construction and the manufacturing process and reduce the manufacturing cost.

In addition, the flame proofing portion 49 is integrally formed with the intermediate base cloth 33 which forms the partition wall portion 48 for separating into the thorax protection portion 54 and the head protection portion 55. Therefore, the number of elements is not increased, and it is possible to simplify the construction and the manufacturing process and reduce the manufacturing cost.

Further, it is possible to improve the heat resistance of the sewed portion 46 of the air bag 24 in the manner mentioned above. Consequently, it is not necessary to excessively increase the heat resistance of the other portions, and for example, it is possible to employ a non-coated or a low denier woven fabric for the base cloths 31 and 32.

Figure 9:
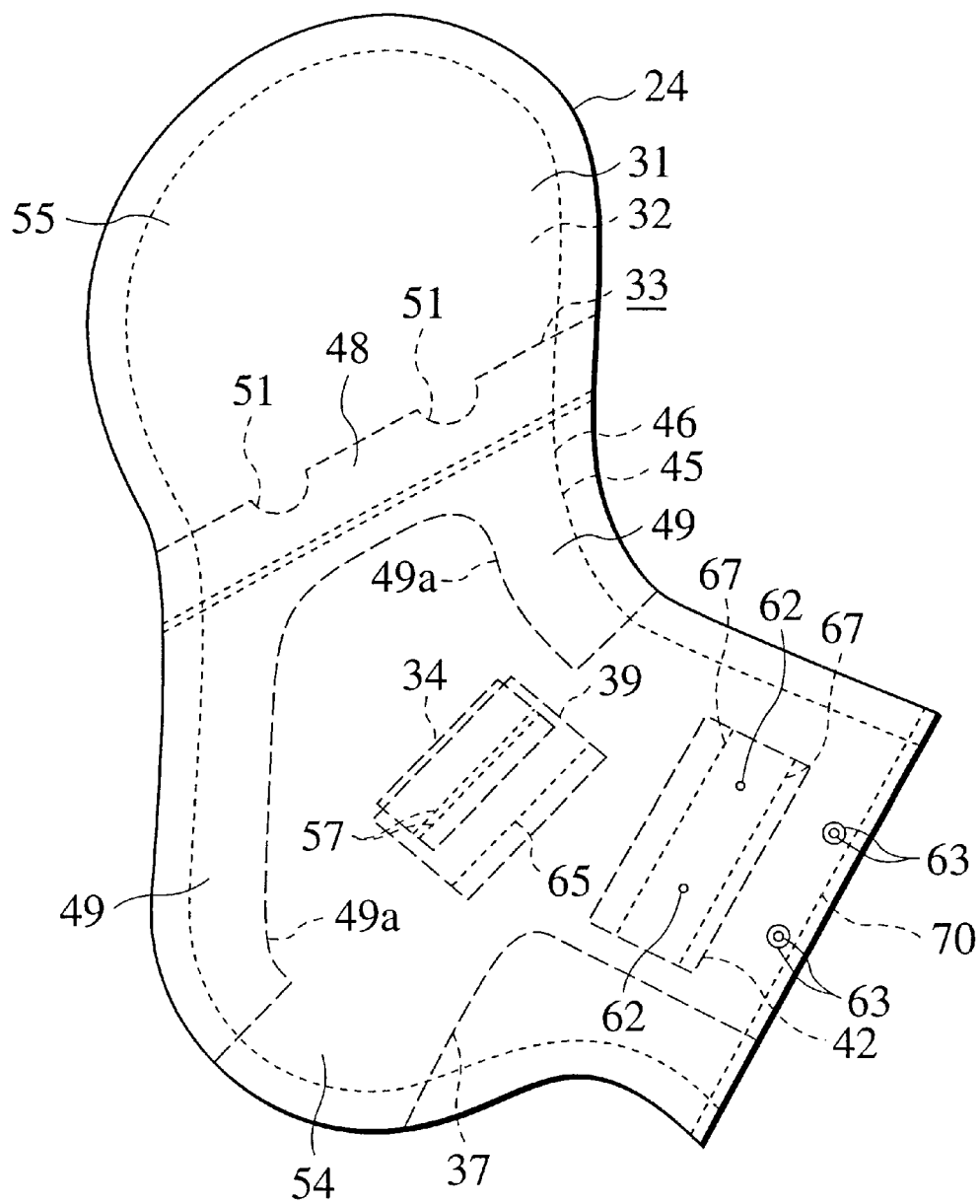
FIG. 9 is a view showing another embodiment of an air bag in accordance with the present invention.

In this case, in each of the above embodiments, as shown in FIG. 3, the intermediate base cloth 33 is structured such that the flame proofing portion 49 extends from one end side of the partition wall portion 48. However, the structure is not limited to this shape. For example, as shown in FIG. 9, the intermediate base cloth 33 can be structured such that the flame proofing portion 49 is extended from both end sides of the partition wall portion 48. The flame proofing portion 49 may be provided only on a side of the seat back 11. Further, the flame proofing portion 49 may be independently formed as the third flame proofing cloth 37 in place of being integrally formed with the partition wall portion 48. The flame proofing portion 49 may be formed to be independent of the intermediate base cloth 33. Further, the flame proofing portion 49 may be positioned in the vicinity of the inflator arranging portion 61 to be provided along the sewed portion 46 on the outer periphery of the air bag 24.

Further, each of the above embodiments is described as a side air bag provided in the side portion of the seat, the pillar of the vehicle body, or the like. However, the present invention can be applied to an air bag provided in various kinds of air bag apparatus, such as an air bag apparatus for a driver's seat, which is provided in a steering wheel and is inflated in a flat circular shape; an air bag apparatus for a front passenger's seat, which is provided in an instrument panel and is inflated in a fan cross section; a curtain-type air bag apparatus for protecting a head and the like; as well as the side air bag. In particular, with respect to the air bag in which it is difficult to turn inside-out the bag after sewing due to the existence of a tether for restricting the inflation of the air bag and of a partition wall which partitions the inner portion, or an inner space, of the air bag into a plurality of partitioned chambers (small sections), there can be obtained the great advantage of improving the heat resistance while reducing the manufacturing cost.

Further, the base cloth of the air bag, each of the flame proofing cloths, the partition wall, the suspending sheet piece (the tether), the reinforcing belt and the like can employ various kinds of sheet-like material in addition to non-coated woven fabric, and for example, can employ material obtained by laminating and applying rubber and resin to the woven fabric so as to apply an impermeable process treatment thereto.

What is claimed is:

1. An air bag comprising:
   a first cloth having a first periphery;
   a second cloth having a second periphery, the second cloth facing the first cloth, the second periphery and first periphery contacting each other and being sewn together with a thread to define a space between the first cloth and the second cloth; and
   a pair of third cloths each having a first edge and a second edge, the first edge being sewn together between the first periphery and the second periphery with the thread, the second edge being apart from the first cloth and the second cloth, and the second edge having an inner edge portion extending into the space and being a free end for proximate to an inflator for covering and protecting the thread from gas discharged by the inflator.

2. An air bag according to claim 1, further comprising:
   a fourth cloth separating the space into chambers, the fourth cloth being formed integrally with the third cloth.

3. An air bag according to claim 2, wherein the first periphery and the second periphery are positioned outside the bag.

4. An air bag according to claim 1, wherein the third cloths are positioned to face an outlet of an inflator, so that the third cloths are directly exposed to gas from the outlet.

5. An air bag according to claim 1, wherein the air bag is positioned at a side portion of an automobile seat to expand and develop for protecting an occupant of the seat.

6. An air bag according to claim 5, further comprising:
   a fourth cloth separating the inner space into a thorax protection portion and a head protection portion, the fourth cloth being integrally formed with the third base cloth.

7. An air bag apparatus comprising:

an inflator with an outlet for discharging gas;

a bag accommodating the inflator, the bag for being filled with discharged gas, the bag having a first cloth with a first periphery and a second cloth with a second periphery, the second cloth facing the first cloth, the second periphery and first periphery contacting each other and being sewn together with a thread to define a space between the first cloth and the second cloth; and a pair of third cloths each having a first edge and a second edge, the first edge being sewn together between the first periphery and the second periphery with the thread, the second edge being apart from the first cloth and the second cloth, and the second edge having an inner edge portion extending into the space and being a free end for proximate to an inflator for covering and protecting the thread from gas discharged by the inflator.

8. An air bag apparatus according to claim 7, further comprising:

a partition cloth separating the space into chambers, the partition cloth being formed integrally with the pair of third cloths.

9. An air bag apparatus according to claim 7, wherein the first periphery and the second periphery is positioned outside the bag.

10. An air bag apparatus according to claim 7 wherein the pair of third cloths is positioned to face the outlet of the inflator, so that the protection cloth is directly exposed to the gas from the outlet.

11. An air bag apparatus according to claim 7, wherein the air bag apparatus is positioned at a side portion of an automobile seat to expand and develop in response to the discharged gas.

12. An air bag apparatus according to claim 11, wherein the bag comprises a partition cloth separating the space into a thorax protection portion and a head protection portion, and the partition cloth is integrally formed with the pair of third cloths.

* * * * *